United States Patent [19]

James

[11] 4,243,369
[45] Jan. 6, 1981

[54] MOULD CLOSING, CLAMPING AND OPENING MEANS

[75] Inventor: Michael J. James, Cheltenham, England

[73] Assignee: Micro & Precision Mouldings (Cheltenham Limited), England

[21] Appl. No.: 966,557

[22] Filed: Dec. 5, 1978

[51] Int. Cl.² ................................................ B29F 1/00
[52] U.S. Cl. .............................. 425/451.2; 425/451.7; 425/450.1; 425/451.9; 425/590; 425/589
[58] Field of Search .................. 425/450, 450.1, 451.2, 425/593, 451.3, 595, 451.4, 451.5, 451.6, 451.9, DIG. 221, DIG. 222, DIG. 223, 590

[56] References Cited

U.S. PATENT DOCUMENTS

| | | | |
|---|---|---|---|
| 2,335,807 | 11/1943 | Smith | 425/DIG. 220 |
| 3,208,373 | 9/1965 | Bachelier | 425/DIG. 220 |
| 3,768,953 | 10/1973 | Dangremond et al. | 425/451.2 |

Primary Examiner—J. Howard Flint, Jr.
Attorney, Agent, or Firm—Young & Thompson

[57] ABSTRACT

Mould closing, clamping and opening means for the split mould of a pressure moulding machine comprises a pair of elongated arms each pivotally attached to the moving platen of the machine at one end and free at the other end, and extending lengthwise between the moving platen and a hydraulic rear clamping platen. During a mould operation the free ends of the arms engage the rear clamping platen so as to act as struts between the rear clamping platen and the moving platen during a mould clamping operation, but during a mould opening operation the arms are swung by an hydraulic cylinder to a position in which they register with openings in the rear clamping platen so that the arms may pass rearwardly through the openings as the mould opens.

14 Claims, 5 Drawing Figures

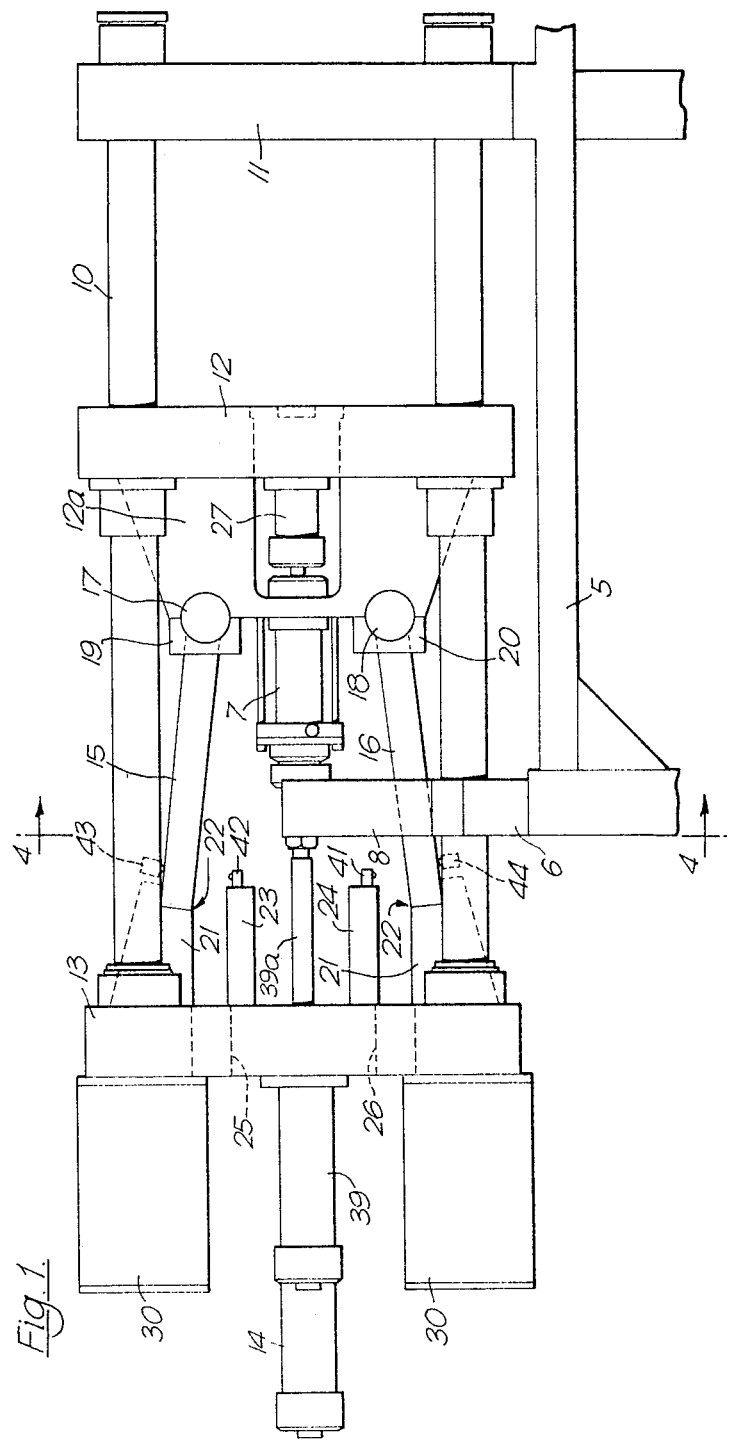

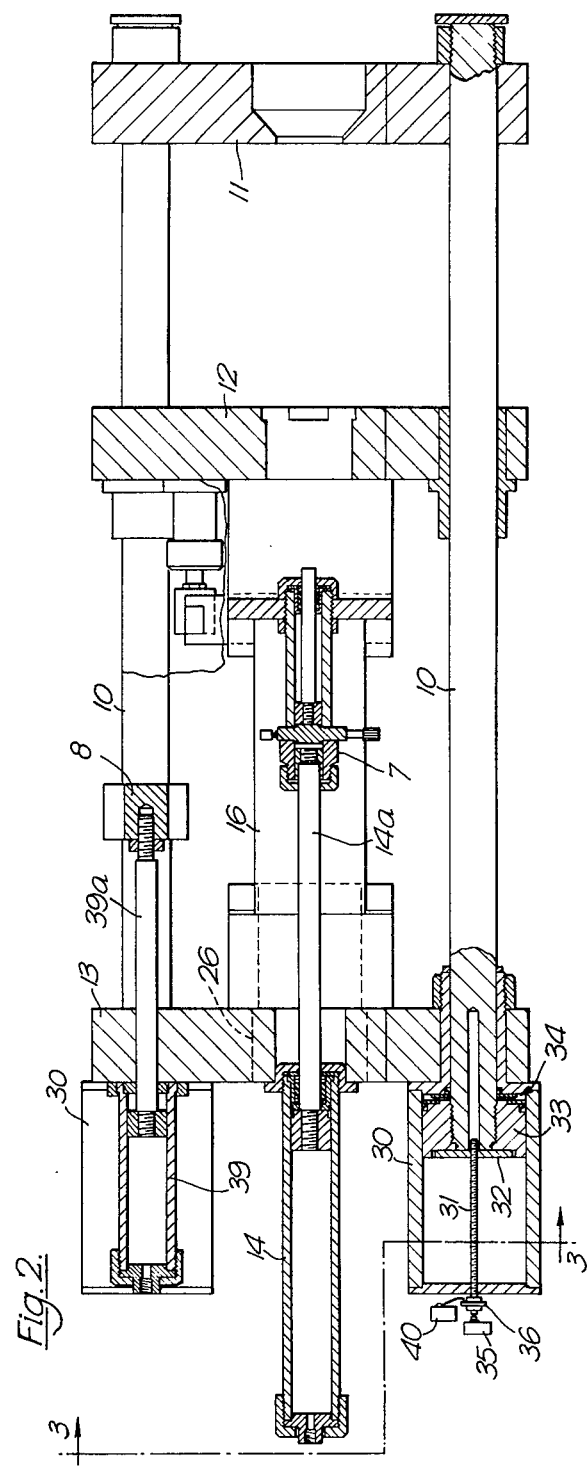

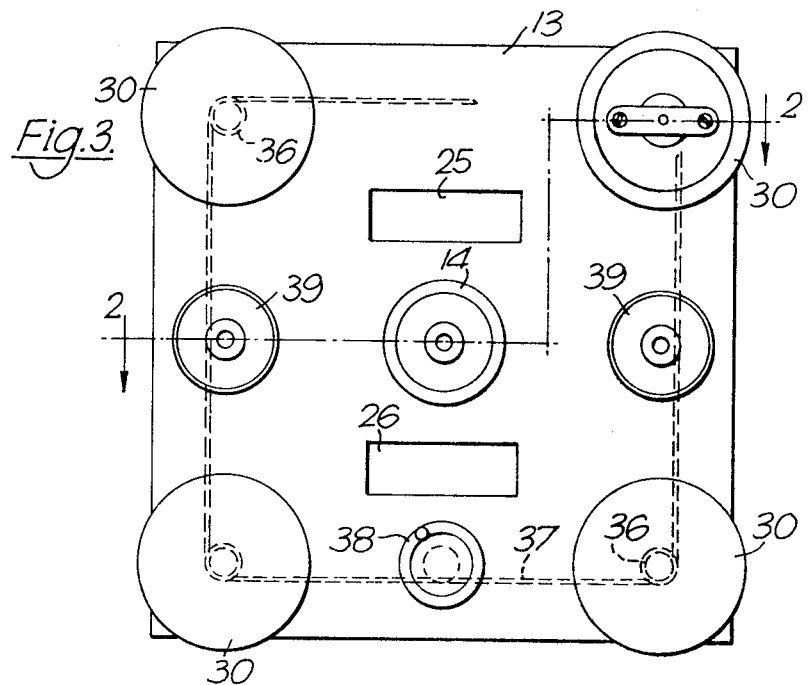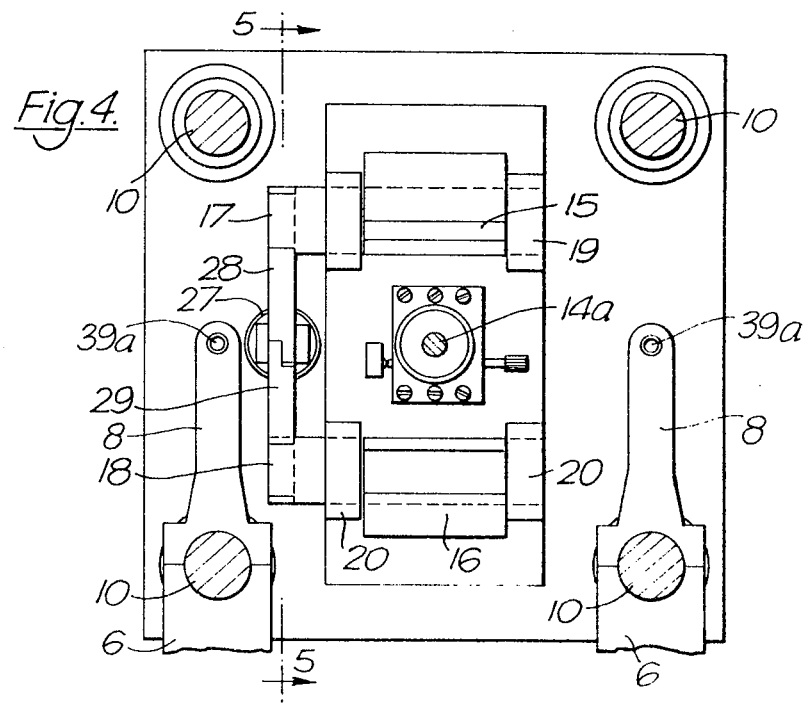

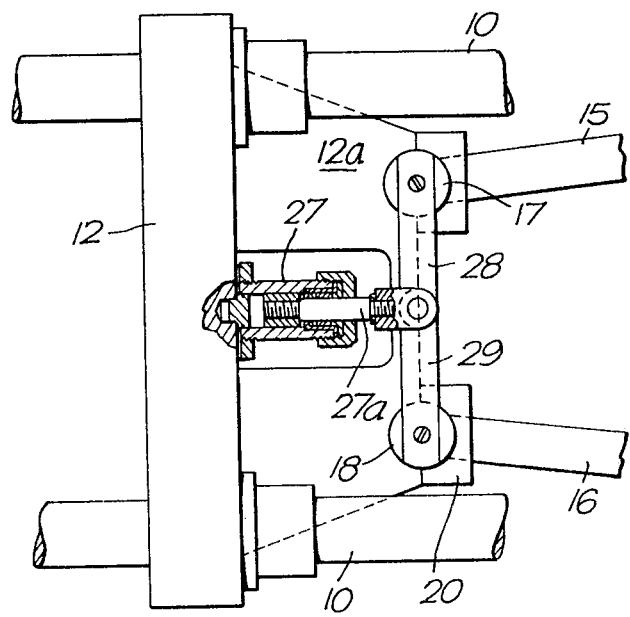

MOULD CLOSING, CLAMPING AND OPENING MEANS

BACKGROUND OF THE INVENTION

This invention relates to the mould closing, clamping and opening means employed in injection moulding machines, pressure die casting machines and other machines in which a moulding material, such as plastics or metal, is injected at high pressure into a tightly clamped split mould or die, the clamping pressure on which is thereafter released for opening and subsequent ejection of the injection moulded or pressure cast component.

In such machines, one part of the split mould is carried by a fixed front platen, and the other part of the mould is carried by a moving platen which is movable towards and away from the fixed platen to close or open the mould. Means are also required to clamp the parts of the split mould together, when in the closed position, by applying a clamping force to the movable platen.

The mould closing, clamping and opening systems of injection moulding machines at present in use are usually hydraulic in operation and can be divided into four main types:

(1) hydraulic approach jack plus swinging arm and clamping jack,
(2) common hydraulic approach and clamping jack,
(3) toggle approach plus clamping jack, and
(4) toggle approach with over-centre action to create clamping force.

In system (1) a swinging arm is arranged to oscillate about an axis parallel to the line of movement of the moving platen towards and away from the fixed platen of the machine, the oscillating movement being timed to interpose the free end of the arm as a distance piece between the moving platen and a fixed hydraulic clamping jack after the moving platen has been moved to the mould closing position by an approach jack, and to remove the free end of the arm during the mould opening time in the machine cycle. The interposition of the free end of the swinging arm between the hydraulic clamping jack and the moving platen saves energy in that it is not necessary for the hydraulic clamping jack to operate over the complete distance required to open and close the mould.

In system (2) the whole process of closing, clamping and opening the mould is performed by one hydraulic jack but the system suffers the major disadvantage of consuming a considerable amount of energy by virtue of the large amount of oil used to move the moving platen between the open and closed positions of the mould.

System (3) uses a double toggle mechanism, the difference in length between the toggle mechanism when extended and the toggle mechanism when collapsed effectively interposing a distance piece between the moving platen and the hydraulic clamping jack at the end of the mould closing operation, so as to permit mould clamping by the clamping jack.

System (4) is similar in operation to system (3) but uses the over-centring characteristics of toggle mechanisms to provide the final mould clamping force.

These last two systems have the advantage of a relatively high speed of operation, resulting in shorter production cycle times, but possess the disadvantage that rapid wear occurs in the toggle mechanism due to the uneven lubrication inherent in the design. Moreover they are expensive to manufacture. System (4) possesses the additional disadvantage that it fails to maintain constant clamping pressures on the mould due to thermal expansion taking place during a working day. All four systems in addition suffer the further major disadvantage that when one of the tie bars connecting the platens breaks they fail to stop the machine instantly which leads to high stresses being induced in the remaining tie bars. Inevitably this causes these remaining tie bars to fail at a later date.

One of the objects of the present invention is to enable the advantage of the first system to be secured whilst avoiding the disadvantages inherent in all the systems. Another object is to provide mould closing, clamping and opening means which are simple in construction and maintenance, smooth and rapid in operation and conserve energy. A further object of the invention is to provide such means wherein the daylight may readily be adjusted in a simple and convenient manner.

SUMMARY OF THE INVENTION

According to the invention mould closing, clamping and opening means for the split mould of a pressure moulding machine comprises an elongated element extending lengthwise between the moving platen of the machine and a hydraulic rear clamping platen, said element acting as a strut between the rear clamping platen and moving platen during a mould clamping operation but being movable to a position in which it registers with an opening in the rear clamping platen and through which it passes rearwardly during a mould opening operation.

Preferably there are a plurality of such elements arranged symmetrically of the moving platen, said elements being pivotally attached to the moving platen at one end and free at the other end, said other end being adapted to lie in abutting relationship to the rear clamping platen operated by hydraulic mould clamping cylinders with the elements disposed at an angle to the centre line of the machine and to be removed from said abutting relationship with openings in the rear clamping platen by angular movement of the elements about their pivotal attachments into positions in which they extend parallel to said centre line.

The elements are preferably in the form of bars and consequently constitute massive push rods between the hydraulic rear clamping platen and the moving platen. There are preferably two of said elements arranged vertically one above the other with their pivot axes horizontal. Thereby, by linking the two pivots to a common hydraulic actuating cylinder, the downward angular movement of the upper element assists in the upward angular movement of the lower element in order to reduce the amount of energy expended on the operation of bringing the two elements into parallelism for escape through the openings in the rear clamping platen during a mould opening operation. If desired projections may be carried by the front face of the rear clamping platen in order to constitute stops for the elements which ensure that the latter do not perform too great an angular movement about their pivots to take them out of register with their escape openings.

It is of importance that even loading of the tie bars should be maintained at all times and to this end the clamping force is supplied by identical hydraulic cylinders, one on each tie bar and supplied with oil under pressure from a common source.

BRIEF DESCRIPTION OF THE DRAWINGS

FIG. 1 is a side elevation of one form of mould closing, clamping and opening means, of an injection moulding machine, in accordance with the invention, FIG. 2 is a horizontal section along the line 2—2 of FIG. 3, FIG. 3 is a vertical section along the line 3—3 of FIG. 2, FIG. 4 is a vertical section along the line 4—4 of FIG. 1, and FIG. 5 is a vertical section along the line 5—5 of FIG. 4.

DETAILED DESCRIPTION OF THE PREFERRED EMBODIMENT

The injection moulding machine shown in the drawings comprises a machine base 5 on which is supported a rectangular fixed front platen 11. Four horizontal tie bars 10 are fixed to the platen 11 adjacent the corners thereof and extend rearwardly therefrom (i.e. to the left in FIGS. 1 and 2). The lower two tie bars 10 are supported, adjacent their ends remote from the platen 11, by brackets 6 on the machine base 5.

The fixed front platen 11 carries one half of the split mould (not shown) and the other half of the mould is carried by a moving platen 12 which is slidable along the tie bars 10 towards and away from the fixed platen. A rear clamping platen 13 is mounted on the ends of the tie bars 10 remote from the fixed platen 11, and is adjustable along the tie bars, in a manner to be described, for the purpose of varying the daylight, i.e. the distance between the platens 11 and 12 in the mould closed position. The daylight requires to be adjusted according to the size of the split mould used in the machine.

The clamping platen may also be urged forwardly on the tie bars 10, by hydraulic jacks 30, for the purpose of applying a clamping force to the closed mould, in a manner to be described.

The moving platen 12 is moved towards and away from the fixed platen 11, to close and open the mould, by a hydraulic jack 14. The cylinder of the jack 14 extends rearwardly from the centre of the clamping platen 13 and the piston rod 14a of the jack projects through a central aperture in the clamping platen and is connected by means of an ejector device 7 to a projecting portion 12a of the moving platen 12.

Interposed between the rear clamping platen 13 and the moving platen 12 is a pair of movable clamp arms 15 and 16. These clamp arms are arranged vertically one above the other and, as best seen in FIG. 1, have their ends nearer the moving platen 12 pivotally arranged in bearings 17 and 18 carried by the aforementioned projecting portion 12a of the moving platen. The bearing caps of the clamp arm pivot bearings are indicated at 19 and 20.

The ends of the clamp arms remote from the bearings 17 and 18 are engageable in abutting relationship with forwardly projecting portions 21 on the rear clamping platen 13, the forward surfaces of the projecting portions 21 may be angled as shown to make mating surface contact with the free ends of the clamp arms, as shown at 22 in FIG. 1.

As best seen in FIG. 5, the pivoted ends of the clamp arms 15 and 16 have connected thereto links 28 and 29 respectively which overlap and are connected to the piston rod 27a of a small hydraulic jack 27, the cylinder of which is mounted on the platen 12. The arrangement is such that by retraction of the jack 27 the clamp arms 15 and 16 may be swung from the position shown in FIGS. 1 and 5 where their ends engage the projecting portions 21, to positions where the arms lie substantially parallel to the longitudinal axis of the machine. In the latter position the ends of the clamp arms 15 and 16 engage clamp arm stops 23 and 24 respectively and are in register with rectangular openings 25 and 26 in the rear clamping platen 13.

Limit switches 41, 42 43 and 44 are positioned to be operated by the clamp arms in a manner to be described.

Mounted on the rear clamping platen 13, adjacent the corners thereof, are four hydraulic clamping jacks 30, one jack being associated with each tie bar 10. The cylinders of the jacks 30 are mounted on the platen 13 and extend rearwardly therefrom, and the pistons 33 of the jacks are mounted on the ends of the tie bars 10 so that the tie bars, in effect, act as the piston rods of the jacks 30. Thus introduction of hydraulic fluid into the right-hand ends (as seen in FIG. 2) of the jacks 30 causes clamping movement of the platen 13 to the right in FIG. 2.

Each tie bar 10 is fitted with an axial screw member 31 which threads into a nut 32 on each piston 33, the nut 32 also acting as a key to prevent the piston 33 from unscrewing from the respective tie bar. The flow of hydraulic fluid to the jacks 30 is controlled by limit switches 35 actuated by the ends of the screw members 31.

Also mounted on the platen 13 and extending rearwardly therefrom are the cylinders of two auxiliary jacks 39 the piston rods 39a of which pass through bores in the platen and are secured at their forward ends to upstanding pillars 8 mounted on the brackets 6.

The operation of the machine is as follows. With the parts of the machine in the "clamp on" position in which the split mould is closed with its two halves clamped firmly together, the clamp arms 15 and 16 lie at an angle to each other, as shown in FIG. 1, and are rigidly interposed between the projecting portions 21 of the rear clamping platen 13 and the projecting portion 12a of the moving platen 12. The clamp arms 15 and 16 accordingly constitute push rods or struts to transmit a clamping load from the rear clamping platen 13 to the moving platen 12 when hydraulic fluid is fed under pressure to the ends 34 of the clamping jacks 30.

When clamping pressure is to be released the fluid pressure is removed from the right-hand ends 34 of the jacks 30 and is applied to the left-hand ends of the auxiliary jacks 39 so as to move the rear clamping platen 13 to the left in FIGS. 1 and 2 away from the clamp arms 15 and 16 sufficiently to create a predetermined gap at 22, the size of the gap being controlled by the coming into operation of limit switches 40 which are operated by rearward movement of the jacks 30.

The clamp arms 15 and 16 are then swung about their pivots 17 and 18 by the means of the hydraulic jack 27 and are brought to a position where they engage the stops 23 and 24 respectively and are substantially parallel to the longitudinal axis of the machine. In this position of parallelism limit switches 41 and 42 are operated causing the mould opening and closing jack 14 to retract the moving platen 12, the clamp arms 15 and 16 escaping rearwardly through the openings 25 and 26 in the rear clamping platen as the moving platen 12 moves to the left in FIGS. 1 and 2.

When the mould is to be closed again, the jack 14 is operated to advance the moving platen 12 to the right in FIGS. 1 and 2. When the platen reaches a position in which the ends of the clamp arms 15 and 16 are free of the openings 25 and 26 and have moved forwardly past the projections 21, limit switches (not shown) are operated to return the clamp arms 15 and 16 to their angled position. As the arms reach this position limit switches 43 and 44 are operated and effect supply of hydraulic fluid to the ends 34 of the jacks 30 to move the rear clamping platen forward into contact with the clamp arms at point 22, thereby clamping the mould.

The method of adjusting the rear clamping platen 13 in order to reduce the daylight will now be described. Hydraulic fluid is fed into the front ends 34 of the clamping jacks 30 which moves the rear clamping platen 13 forward. This causes the ends of the screw members 31 to contact the limit switches 35 checking the flow of oil in the front ends 34 of the jacks. Accordingly if the members 31 are screwed further in they leave the limit switches 35 which causes more oil to be fed into the ends 34 of the jacks 30. The position of the screw members thus determines the daylight.

For the purpose of adjusting the four screw members 31, each is provided with a sprocket 36 (FIGS. 2 and 3) and the sprockets 36 are turned in unison by a chain 37 driven by a hand-wheel 38 as shown in FIG. 3.

In order to increase the daylight, turning the hand-wheel 38 in the opposite direction from that in which it was turned to reduce the daylight causes the screw members 31 to leave the limit switches 40 which in turn causes oil to be fed to the auxiliary jacks 9 thus moving the rear clamping platen 13 rearwardly and causing the screw members 31 to contact the limit switches 40 again which will, in turn, check the movement of the auxiliary jacks. In the event of a tie bar breaking, the rear part of the broken bar causes one of the limit switches 35 (the switches being wired in series) to cut all further oil supply to the clamping jacks 30 thereby effectively stopping the machine and preventing the remaining tie bars being overstressed.

With the mould closing, clamping and opening arrangement described above, high speed of operation may be achieved, equal loading is maintained on the four tie bars of the machine and the layout is such that the clamp arms exert their pressure on the moving platen so that the pressure is not applied centrally of the mould but is nevertheless within the periphery of the latter which reduces any tendency to bowing of the moving platen.

I claim:

1. Mould closing, clamping and opening means for the split mould of a pressure moulding machine, comprising: a plurality of spaced parallel tie bars; a moving platen which is movable along the tie bars, together with one part of the split mould, to open or close the mould; a clamping platen spaced from the moving platen and also movable along the tie bars; a plurality of hydraulic clamping piston and cylinder means, acting respectively between each tie bar and the clamping platen and supplied with oil under pressure from a common source; further hydraulic piston and cylinder means acting between the clamping platen and the moving platen, for effecting mould opening or closing movement of the moving platen; at least one elongate element pivotally mounted at one end thereof on the moving platen, the opposite end of the elongate element being free; an abutment on the clamping platen; an opening through the clamping platen; and means for pivotally moving the elongate element relative to the moving platen between an operative position in which the free end thereof engages the abutment on the clamping platen, so that the elongate element acts as a strut to transmit a clamping load, applied by said plurality of clamping hydraulic piston and cylinder means, from the clamping platen to the moving platen, and an inoperative position in which the free end of the elongate element registers with said opening through the clamping platen, to permit movement of the moving platen, under the action of the further hydraulic piston and cylinder means, towards and away from the clamping platen during a mould opening or closing operation.

2. Mould closing, clamping and opening means according to claim 1, wherein there are provided four spaced parallel tie bars symmetrically disposed with respect to the moving platen and clamping platen, and four hydraulic clamping piston and cylinder means acting respectively between each tie bar and the clamping platen.

3. Mould closing, clamping and opening means according to claim 1, wherein said elongate element is disposed at an angle to the centre line of the pressure moulding machine when in said operative position, and extends substantially parallel to said centre line when in said inoperative position.

4. Mould closing, clamping and opening means according to claim 1, wherein there are a plurality of said elongate elements arranged symmetrically of the moving platen.

5. Means according to claim 4, wherein there are two of said elements arranged vertically one above the other with the pivot axes horizontal.

6. Means according to claim 4, wherein an hydraulic actuating cylinder is provided to effect said pivoting movement of the elongated element.

7. Means according to claim 5, wherein pivoting movement of both elongated elements is effected by a common hydraulic actuating cylinder.

8. Means according to claim 1, wherein a projection is carried by the front face of the rear clamping platen in order to constitute a stop for the element which ensures that the latter does not perform too great an angular movement about its pivot axis to take it out of register with said opening.

9. Means according to claim 8, comprising means for supplying oil to said clamping cylinders from a common source, and limit switches operated by relative movement of said pistons and cylinders to a predetermined position to check the flow of oil to said cylinders when said predetermined position is reached.

10. Means according to claim 9, wherein said limit switches are operated by the ends of screw members extending axially of the tie rods and adjustable longitudinally with respect to the tie rods by screwing them into or out of the tie rods.

11. Means according to claim 10, comprising means for effecting simultaneous longitudinal adjustment of said screw members.

12. Means according to claim 11, wherein the means for effecting simultaneous longitudinal adjustment of the screw members comprise sprockets carried by the screw members and engaged by a chain driven by an operating wheel.

13. Means according to claim 1, further comprising at least one auxiliary hydraulic piston and cylinder means acting between the clamping platen and a bracket which is fixed in relation to the tie bars, for effecting powered adjustment of the clamping platen relative to the tie bars.

14. Means according to claim 13, wherein said auxiliary hydraulic piston and cylinder means comprise a cylinder mounted on the clamping platen and extending longitudinally of the tie bars, and a piston disposed within the cylinder and connected to a piston rod which extends longitudinally from the cylinder and is secured to said bracket which is fixed in relation to the tie bars.

* * * * *